United States Patent [19]
Zehnder

[11] 3,948,188
[45] Apr. 6, 1976

[54] RESILIENT RAILWAY BOGIE

[75] Inventor: Jurg Zehnder, Zurich, Switzerland

[73] Assignee: Swiss Aluminium Ltd., Chippis, Switzerland

[22] Filed: Aug. 29, 1973

[21] Appl. No.: 392,648

Related U.S. Application Data
[63] Continuation of Ser. No. 149,924, June 4, 1971, abandoned.

[30] Foreign Application Priority Data
June 5, 1970   Switzerland.......................... 8454/70

[52] U.S. Cl.......... 105/167; 105/182 R; 105/197 R; 105/197 T; 105/218 A; 105/224 R; 267/3; 267/54 R
[51] Int. Cl.².... B61F 3/08; B61F 5/06; B61F 5/38; B61F 5/52
[58] Field of Search.... 105/179, 182 R, 211, 218 A, 105/167, 165, 168, 197 R, 197 T, 224 R; 267/3, 541 R

[56]   References Cited
UNITED STATES PATENTS

| 1,526,410 | 2/1925 | Aspinwall | 105/211 |
| 1,576,298 | 3/1926 | Barbey et al | 105/179 |
| 1,962,893 | 6/1934 | Christianson | 105/182 R |
| 2,098,459 | 11/1937 | McWhirter | 105/182 R |
| 2,197,727 | 4/1940 | Ledwinka | 105/182 R |
| 2,242,422 | 5/1941 | Eksergian | 105/182 R |
| 2,594,734 | 4/1952 | Cripe | 105/182 R |

FOREIGN PATENTS OR APPLICATIONS
387,504   3/1940   Canada.......................... 105/218 A Primary Examiner—Robert J. Spar
Assistant Examiner—Howard Beltran
Attorney, Agent, or Firm—Ernest F. Marmorek

[57]   ABSTRACT

A truck for a vehicle, especially a railway car, comprising a plurality of pairs of wheels for running on rails, a plurality of axles respectively interconnecting the wheels of a pair of wheels, a cross-beam extending substantially parallel to the axles, a plurality of rocker arms, and a plurality of ball joint-type means connecting the rocker arms to the cross-beam and to the plurality of axles, respectively, whereby the axles may carry out pendulum movements in substantially vertical and horizontal directions relative to the rails, and spring means interposed between the cross-beam and the rocker arms permitting movement of the latter in the mentioned directions.

5 Claims, 9 Drawing Figures

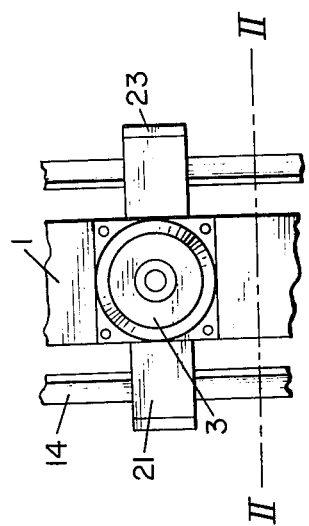
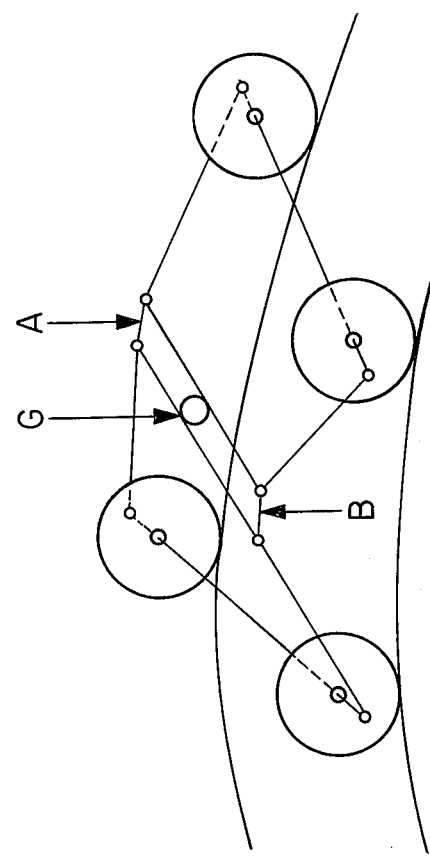
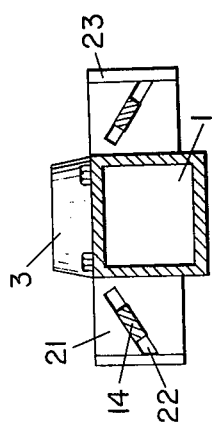
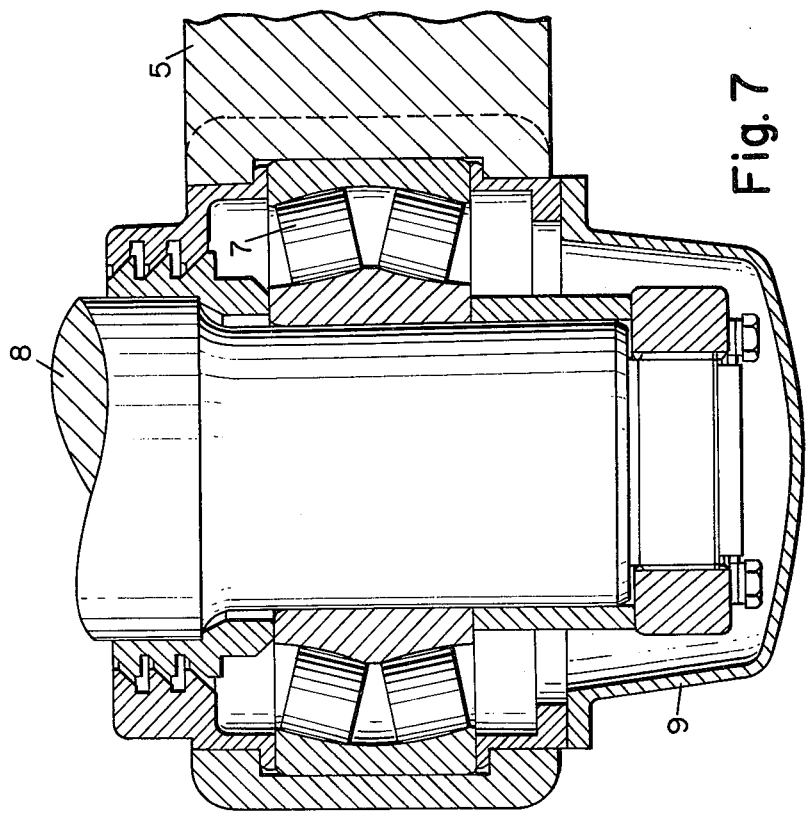

RESILIENT RAILWAY BOGIE

CROSS REFERENCE TO RELATED APPLICATION

This application is a continuation of copending parent application, Ser. No. 149,924, filed June 4, 1971, now abandoned.

FIELD OF THE INVENTION

The present invention relates to a truck for vehicles running on rails, especially for railway freight cars.

Trucks customarily used for this purpose comprise a frame with cross beams for receiving and supporting the body of the railway carriage and in which frame the pairs of wheels of the truck are merely vertically yieldably journalled in sliding block guides or bearings. The prior art also teaches a truck in which longitudinally extending rocker arms or levers serve for guiding the axles of the truck. In this arrangement, the arms or levers are journalled in rubber sleeves at the truck frame and are provided at the ends of torsion rods which are anchored adjustably in the center of the trucks so that rocker arm or levers may be adjusted as to height.

With both the above mentioned types of vehicle trucks lateral shock cannot be absorbed, and this is very disadvantageous considering the running properties of the truck and the wear of the wheel flanges of the truck.

It is, therefore, an object of the present invention to provide a truck for vehicles running on rails, and especially for railway freight cars, in which the wheels of the truck which are guided by rocking arms or levers, may absorb resiliently lateral shocks.

It is another object of the present invention to provide a vehicle truck of the just described type in which the position of the axles of the wheel adapt themselves to the momentarily prevailing conditions when passing through curves.

BRIEF SUMMARY OF THE INVENTION

The truck designed in accordance with the present invention, in which the pairs of wheels of the truck are guided in rocker arms, is characterized in that the rocker arms are connected in the manner of a ball joint with the cross bar as well as with the axles of the wheels. More specifically, they are connected in such a manner that they may carry out pendulum movements in a vertical as well as in a horizontal direction, a corresponding resiliency of the rocker arms being provided for likewise in the vertical as well as in the horizontal direction. Possibly, the ball joint type connection between the rocker arms and the cross bar is affected by rocker bearings, and the connection between the rocker arms and the wheel axles by spherical or pendulum type or self-aligning roller bearings.

In order to accomplish the resiliency or springyness in horizontal direction, advantageously spring rods are being used which extend substantially parallel to the cross bar and which are held at one end in the rocker arms so as to prevent twisting thereof, and preferably at those ends where the rocker arms are journalled. At their other ends, the spring rods may be directly or indirectly connected to the cross bar. A still simpler solution consists in that the spring rods are connected with one end each in one rocker arm each of a pair of wheels. In addition, the spring rods at their clamped ends may be designed as rocker axles for the rocker arms and may be journalled in a rocker bearing. In a manner known per se, the rocker arms are resiliently supported in vertical direction by leaf or helical springs.

With a truck designed in accordance with the present invention, the shocks or transverse forces caused by unevenness of the rails changes in the direction of movement at the pairs of wheels of the truck, are absorbed or received by the suspensions of the pairs of vehicles themselves and are not directly transferred to the cross beam of the truck so that an almost shock-free run of the truck is guaranteed.

In a very advantageous further development of the truck according to the invention, the plane passing through the rocker axles is located above the plane passing through the axles of both pairs of wheels. This arrangement yields the advantage that when passing through curves, the spacing of the wheels located on the outside and thereby under greater load because of the centrifugal force, is increased while the spacing on the opposite side becomes smaller so that the pairs of wheels adapted themselves to the curve.

BRIEF DESCRIPTION OF THE DRAWINGS

The invention is illustrated by way of example in the attached drawings, in which:

FIG. 4 is a diagramatic illustration of the forces acting on a truck when passing through a curve;

FIG. 5 is a partial view of a truck according to a second embodiment of the present invention;

FIG. 6 is the section taken along the line II—II of FIG. 5.

FIG. 7 is a sectional view of a self-aligning roller bearing for supporting rocker arms on the axles of the truck wheels;

DETAILED DESCRIPTION OF PREFERRED EMBODIMENT OF THE INVENTION

Figure 1:
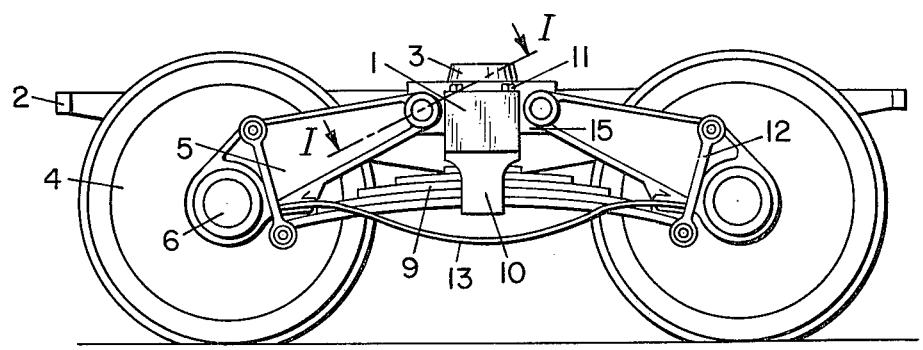
FIG. 1 is a side view of a truck designed in accordance with the present invention.
Figure 2:
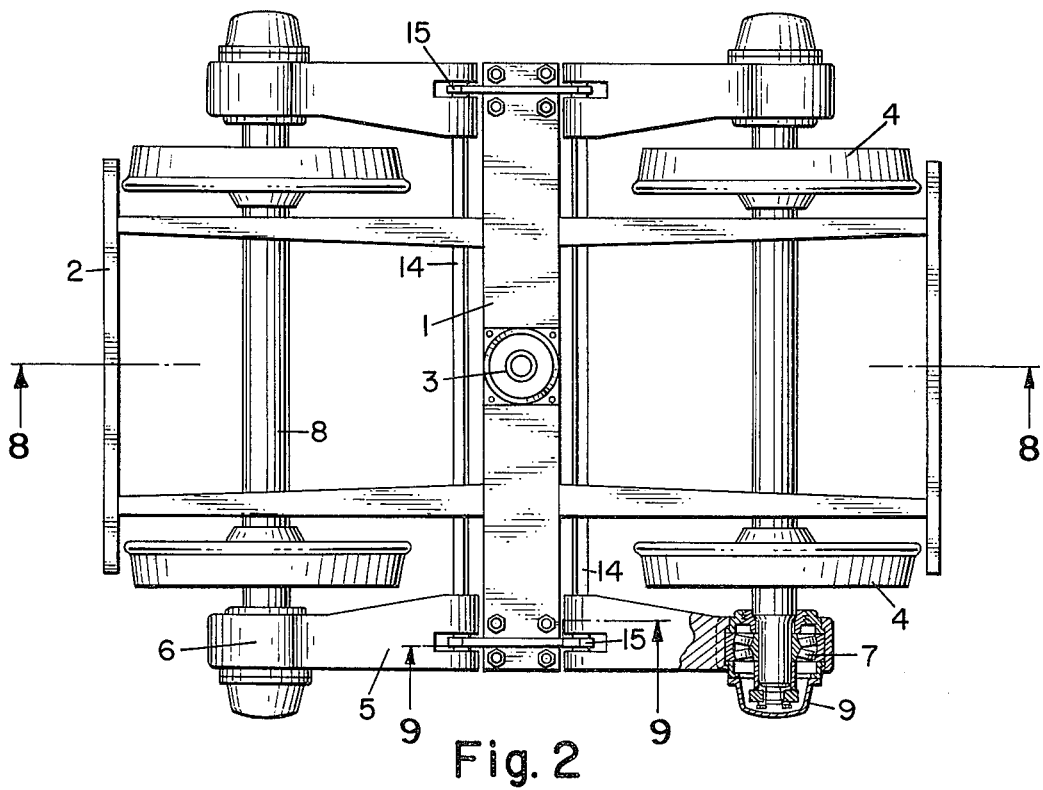
FIG. 2 is a top view of the truck of FIG. 1.

Referring now to the drawings in detail, and FIGS. 1 and 2 in particular, the truck shown therein comprises a cross beam or bolster 1 with frames 2 for receiving auxiliary equipment (not shown) such as braking devices. Cross beam 1 is provided with a ball-supported turntable or center bearing 3 for receiving and supporting the vehicle body. Rocker arms 5 serve for receiving the pairs of wheels 4 and have one end thereof connected to the cross beam as shall be explained in detail in connection with FIG. 3, and have their other ends designed as bearing housings 6 in which spherical or pendulum roller bearings 7 are provided for respectively supporting the axles 8 of the pairs of wheels 4 as shown in greater detail in FIG. 7.

Leaf springs 9 serve for absorbing vertical forces, the springs being connected to the ends of the cross bar 1 by threaded bolts 11. The ends of the leaf springs 9 are connected to the rocker arms 5 by pendulum rods 12.

The two rocker arms 5 on one side of the truck are interconnected by a loosely suspended wire cable 13 which serves as an emergency device upon fracture of the leaf spring 9. Upon such fracture, the frame of the truck is lowered until the wire cable 13 becomes stretched and supports the load.

Figure 3:
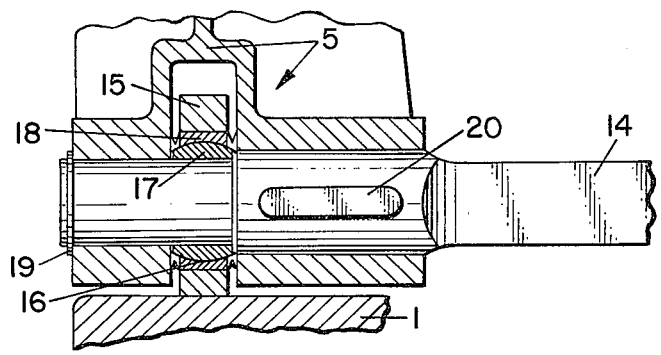
FIG. 3 is a cross section taken along the line I—I of FIG. 1.
Figure 8:
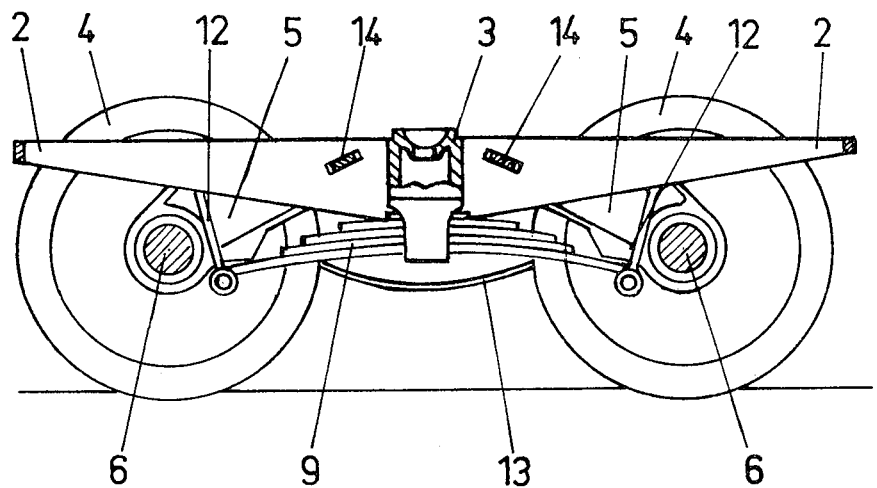
FIG. 8 is a sectional view along the line 8—8 of FIG. 2.
Figure 9:
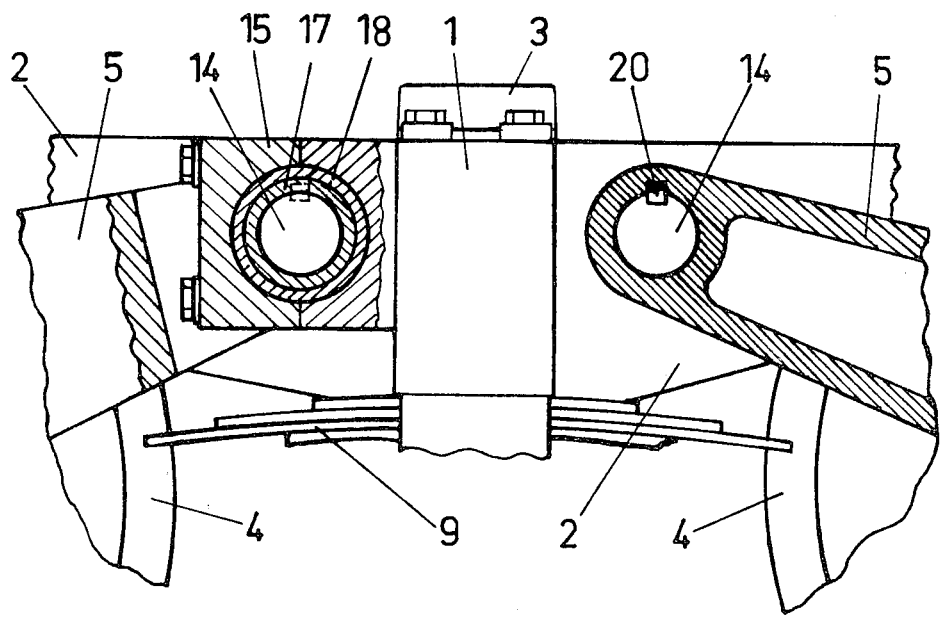
FIG. 9 is a large scale partial sectional view along the line 9—9 of FIG. 2.

As shown in detail in FIG. 3, those ends of the rocker arms 5 which are remote from the axle bearing housing 6, of each pair of wheels are designed in the form of a fork and are interconnected by means of a spring rod 14 of rectangular cross section. Each spring rod 14 has its ends journalled in bores of the rocker arm, extends parallel to cross bar 1 and simultaneously serves for physically connecting the rocker arms with the bearing block 15 provided at the ends of the cross bar 1. The spring rods 14 are rotatably journalled in pendulum-type or self-aligning bearings 16 in these bearing block 15. The bearing 16 consists of an inner bearing ring 17 with a spherical outer bearing surface and an outer bearing ring 18 with a spherical inner bearing surface resting on the outer surface. The spring rods 14 are held in their axial position by a spring ring 19 and are prevented from rotation or twisting relative to the rocker arm by a key 20. As a result, rocking axes have been created which extend parallel to the transverse axis of the truck and about which both pairs of truck wheels are tiltable in a resilient manner. The plane passing through the rocker axes of both pairs of wheels is located vertically above the plane passing through the axes of the two pairs of wheels 4, and substantially parallel thereto. The importance of this arrangement will become evident from the following description.

When lateral shocks acting on the pairs of wheel occur, for instance by lateral deviation of the rail from its normal position or upon movement of the truck along a sinus curve, or upon entering a curve, these shocks tend to change the straight direction of movement of the trucks, and the pairs of wheels are displaced transversely to the longitudinal axis of the truck. Consequently, the rocker arms are tilted about their bearings 16 transversely to the direction of movement of the truck and against the force of the spring rods 14, which is made possible by the fact that the connection between the axes of the pairs of wheels 4 and the rocker arms 5 has been established by the pendulum roller bearings 7. Due to this pivoting, the spring rods 14 clamped in the rocker arms are elastically bent in opposite directions from their normal position in an S-shaped manner, and thereby resiliently absorb all transverse shocks. It is also advantageous in this connection to dimension the spring rods such that they do not have a large resistance to torsion. This permits the differences in wheel pressure to remain small when passing over uneven rails.

With reference to FIG. 4, when passing through a curve, the centrifugal force resulting from the total weight G of the body of the vehicle including the truck results in a greater load (indicated by the arrow A) on that side of the truck which is remote from the center of curvature. Consequently the rocker arms located on that side are tilted away from each other about their bearings 16 and the distance between the corresponding two wheels will be enlarged. On the opposite side closer to the center of curvature, the wheels are being relieved (arrow B) so that the rocker arms on this side are pivoted about their bearings in downward direction so that these wheels are moved closer to the other.

As will be evident from the above, the two axes of the wheels of the vehicle do not remain parallel to each other but converge towards the inside of the curve so that each pair of wheels adapts itself to the curve. By proper dimensioning of the individual components of the spring support or spring suspension system it is possible to achieve when passing through curves with the most commonly used radii, with the most frequently selected speed, that the pairs of wheels adjust themselves radially or nearly radially towards the center of curvature so that the wear between the rail and the wheel, i.e., the so-called flanged-wheel wear is reduced to a minimum.

The thus described structure is, therefore, very advantageous for cars used along rights of ways with a great number of curves, such as in the mountains.

In accordance with a further embodiment according to the present invention, the spring rods may be held against twisting in the center between the roller bearings and are preferably slidable in their support and more specifically in a plane respectively passing approximately through the axis of the rocker arms and through the axes of the pairs of wheels in their normal position. In this arrangement, the spring rods designed as torsion springs may absorb in addition the vehicle weight and the shocks occurring in vertical direction.

Referring specifically to the embodiment shown in FIGS. 5 and 6, the truck shown therein differs from that of FIGS. 1 and 2 merely in that the spring rods 14 are so dimensioned that they serve as torsion springs and can absorb the total weight and simultaneously take over the function of the springs 9 which therefore may be omitted. For this purpose, on both sides in the center of cross bar 1 bearing block 21 are provided with slots 22 for receiving the spring rods 14 in such a way that they are prevented from twisting. Slots 22 are so designed that the spring rods may be moved back and forth in a plane passing through the axes of the rocker arms and the axes of the pairs of wheels pertaining thereto and in their normal position, during their S-shape elastic bending movement. Upon insertion of the spring bar or rod in its respective slot 22, a cover plate 23 is placed upon the end face of the blocks 21.

In the arrangements described above, the unsprung mass will become minimal in vertical and in horizontal direction. Moreover, the movement of inertia of the truck about the high axis will become very small so that upon entering a curve, the forces trying to twist the truck will likewise be very small. Thus, a smooth and quiet ride of the vehicle is assured.

From the above, it is apparent that although the invention has been described hereinbefore with respect to a certain specific embodiment thereof, it is evident that many modifications and changes may be made without departing from the spirit of the invention. Accordingly, by the appended claims, we intend to cover all such modifications and changes as fall within the true spirit and scope of this invention.

What is claimed is:

1. A truck for a vehicle, especially a railway freight car, comprising:
   first and second pairs of laterally spaced apart wheels operable for running on rails;
   two axles each interconnecting the wheels in one of said pairs of wheels;
   a cross-beam extending substantially parallel to said axles;
   four rocker arms each connected at one end thereof to one end of each of said axles and the other end of each rocker arm connected to said cross-beam;
   two spring rods each extending substantially parallel to said cross-beam and establishing a torsion connection between said rocker arms connected to the same axle;

a plurality of ball joint-type means connected to said cross-beam for mounting said spring rods and said rocker arms;

spring means interconnecting said cross-beam to said rocker arms and operable to urge said cross-beam and said rocker arms to an equilibrium relationship with respect to each other, whereby said axles exhibit pendulum movements in vertical and horizontal directions relative to said cross-beam; and an imaginary plane defined by said one ends of said rocker arms being disposed vertically below another imaginary plane defined by said other ends of said rocker arms.

2. The truck as claimed in claim 1, wherein said ball joint-type means connecting said rocker arms to said axles each include self-aligning roller bearing means.

3. The truck as claimed in claim 1, wherein said spring means includes leaf springs having a central portion connected to said cross-beam and four rod means connecting said rocker arms to each of said leaf springs.

4. The truck as claimed in claim 1, wherein said spring rods each have a substantially rectangular cross-section.

5. The truck as claimed in claim 1, wherein each end of said spring rods forms a part of the connection between each of said rocker arms and said cross-beam.

* * * * *